United States Patent [19]

Hinz et al.

[11] Patent Number: 6,000,765
[45] Date of Patent: Dec. 14, 1999

[54] PROCESS FOR ATTENUATING THE YAWING MOMENT IN A VEHICLE WITH AN ANTI-LOCK BRAKING SYSTEM

[75] Inventors: Wolfgang Hinz, Wunstorf; Harald Köster, Hannover; Konrad Rode, Seelze; Hartmut Rosendahl, Hannover; Frank Zielke, Barslughausen, all of Germany

[73] Assignee: WABCO GmbH, Hannover, Germany

[21] Appl. No.: 08/968,815

[22] Filed: Nov. 17, 1997

[30] Foreign Application Priority Data

Nov. 20, 1996 [GE] Georgia .............................. 196 47 997

[51] Int. Cl.[6] ....................................................... B60T 8/32
[52] U.S. Cl. .............................................................. 303/148
[58] Field of Search .................................... 303/146, 148, 303/149, 118.1, 127, 121, 176, 156, 140, 141, 147; 701/73, 71, 78, 80, 90

[56] References Cited

U.S. PATENT DOCUMENTS

| | | |
|---|---|---|
| 3,988,043 | 10/1976 | Reinecke . |
| 4,313,166 | 1/1982 | Rode et al. . |
| 4,349,876 | 9/1982 | Lindemann . |
| 5,315,518 | 5/1994 | Lin .......................................... 303/148 |
| 5,865,514 | 2/1999 | Striegel et al. ........................... 303/149 |

FOREIGN PATENT DOCUMENTS

| | | |
|---|---|---|
| 0 191 169 A1 | 8/1986 | European Pat. Off. . |
| 24 60 309 | 6/1976 | Germany . |
| 28 55 326 | 7/1980 | Germany . |
| 28 51 107 C3 | 2/1986 | Germany . |
| 37 35 165 A1 | 4/1988 | Germany . |
| 39 03 585 A1 | 8/1990 | Germany . |
| 41 14 734 A1 | 11/1992 | Germany . |
| 44 06 235 A1 | 8/1995 | Germany . |

Primary Examiner—Robert J. Oberleitner
Assistant Examiner—Melanie Talavera
Attorney, Agent, or Firm—Proskauer Rose LLP

[57] ABSTRACT

A process for reducing the yawing moment that develops during hard braking in a vehicle equipped with an anti-lock braking system (ABS) and traveling on a roadway having different coefficients of friction on opposite sides of the vehicle is disclosed. The driver must compensate for the yawing moment by steering towards the side that has the lower coefficient of friction. The process comprises venting the brake cylinder of the front wheel on the side with the higher coefficient of friction for a time $t_{AH}$ that is calculated in an electronic control module. The algorithm for computing $t_{AH}$ depends on the venting time $t_{AL}$ at the front wheel on the side with the lower coefficient of friction and the maximum or so-called deregulating pressures attained in the cylinders of the rear wheels. The electronic control module receives pressure information from pressure sensors and ascertains the venting time $t_{AL}$ that the ABS produces at the slipping front wheel. The algorithm used by the electronic control module attenuates the yawing moment in a way that adapts automatically to changing road conditions and vehicle types or loads. This contributes to a shortening of the overall braking distance while maintaining controllability of the vehicle.

26 Claims, 2 Drawing Sheets

PROCESS FOR ATTENUATING THE YAWING MOMENT IN A VEHICLE WITH AN ANTI-LOCK BRAKING SYSTEM

BACKGROUND OF THE INVENTION

The present invention relates to a process for attenuating the yawing moment in a vehicle with an anti-lock braking system (ABS). The present invention is related to the inventions disclosed in commonly assigned co-pending applications Ser. No. 08/756,593, filed Nov. 27, 1996, and Ser. No. 08/854,289, filed May 9, 1997.

When a vehicle brakes on a road that is $\mu$-split, meaning it has different coefficients of friction under the left and right sides of the vehicle, a yawing moment occurs that pulls the vehicle in the direction of the side with the higher coefficient of friction. The driver must counteract this effect by steering in the opposite direction. This can be a problem for an inexperienced driver, particularly if the yawing moment occurs suddenly or is especially strong. The yawing moment is generally larger for vehicles that are lightly loaded or have a short wheel base or a wide gauge. It is also harder to control yawing in a vehicle with a wide positive steering radius. Even in the absence of such load and design factors, yawing can be difficult for the driver to control under extreme road conditions such as dry pavement on one side and ice on the other. Yawing is also more exaggerated during especially hard braking, which can be hardest of all when the vehicle is equipped with a regulating anti-lock brake system (ABS).

Special electronic measures that can be taken within an anti-lock brake system (ABS) to counteract yawing are already known from DE-OS 28 55 326 (U.S. Pat. No. 4,349,876). These measures attenuate the yawing moment and make it easier for the driver to adjust to the onset of yawing when braking takes place on a road with different surfaces on the right and left sides of the vehicle. The wheel running on the side of the road with the higher coefficient of friction is called the "high" wheel and the wheel on the other side of the axle is called the "low" wheel. The onset of the yawing moment is controlled by building up the braking pressure in the high wheel with a predetermined time delay. The braking pressure in the high wheel is also prevented from rising above a constant value, thereby relieving the driver of the need to counter an excessive yawing moment.

Lately, vehicles equipped with so-called electrically controlled braking systems (EBS) have also become known. In such braking systems, e.g., the braking system described in DE-OS 44 06 235, the actual value of the braking pressure in a brake cylinder is adjusted to a desired braking value generated by a braking force transmitter. Normally, these EBS braking systems are also equipped with an anti-lock brake system (ABS). Because pressure sensors are used in an electrically controlled braking system (EBS), it is possible to limit the braking pressure difference ($\Delta P$) between the high wheel and the low wheel and thereby reduce the yawing moment. See DE-OS 24 60 309 (U.S. Pat. No. 3,988,043) for another example where braking at the high wheel is co-controlled by the braking at the low wheel, which is controlled directly by an ABS. The pressure sensors of an EBS also make it possible to prevent the pressure at the high wheel from rising above a predetermined value.

Finally DE-PS 28 51 107 (U.S. Pat. No. 4,313,166) discloses a method by which a vehicle with an ABS produces slowly rising, mostly smooth yawing moments on $\mu$-split road surfaces. In this method, the braking pressure on the high wheel is maintained at a constant value during the venting of the low wheel until the slip signal ($\lambda$) of the low wheel drops. Following this, the high wheel is also vented, and this for a period of time which amounts to a certain fraction of its pressure holding time.

The disadvantage of the known arrangements is that the resulting attenuation of the yawing moment is not adapted in real time to the nature of the vehicle and both sides of the road. First, the braking pressure at the high wheel depends on the braking pressure evolution of the low wheel, and its starting phase is therefore limited. As a result, the maximum admissible braking force of the high wheel that produces a yawing that the driver can control is not always utilized sufficiently. It is also possible that, in some cases, excessive under-braking of the high wheel causes the braking distance to be unnecessarily increased. It is also possible that the predetermined constant pressure difference ($\Delta P$) is too high at times. For example, a lightly loaded vehicle, or a tractor with no trailer, may be difficult or impossible for the driver to control during hard braking on a severely $\mu$-split roadway.

It is therefore the object of the present invention to propose a process for attenuating the yawing moment that, on the one hand, relieves the driver from excessive counter-steering and, on the other hand, shortens the braking distance of the vehicle from that of known systems.

SUMMARY OF THE INVENTION

In accordance with the present invention, a process is disclosed for reducing yaw during hard braking in a vehicle equipped with an anti-lock braking system (ABS) and traveling on a roadway having different coefficients of friction on opposite sides of the vehicle. The process comprises venting the brake cylinder of the front high wheel for a time to that depends on the venting time $t_{AL}$, of the front low wheel and the pressures in the cylinders of drive wheels at the rear of the vehicle.

The desired venting time $t_{AH}$ is calculated in an electronic control module, which receives pressure information from pressure sensors at the rear wheel cylinders and ascertains the venting time that the ABS produces at the front low wheel $t_{AL}$. The algorithm used by the electronic control module produces a venting time $t_{AH}$ at the front high wheel that is linearly proportional to the venting time $t_{AL}$ at the front low wheel. Thus when the front low wheel cylinder vents for a longer time, because the wheel slip is pronounced, the electronic control will limit the yawing moment by causing the front high wheel cylinder to vent for a longer time also. On the other hand, when the low front wheel cylinder vents for a shorter time, because the wheel slip is minimal, the electronic control will cause the vehicle to stop sooner by also shortening the venting time $_{AH}$ at the front high wheel.

The venting time $t_{AH}$ at the front high wheel calculated by the electronic control module is also linearly proportional to the maximum brake pressures occurring at the rear wheels. The product of the constants that relates $t_{AH}$ to the pressures is negative. Thus if the vehicle is lightly loaded, making the rear wheels more prone to slip, the maximum or so-called deregulating brake pressure achieved in the rear wheel cylinders will be relatively low. This low pressure reflects relatively low braking forces exerted by the road on the vehicle at its rear wheels, which makes yawing more difficult to counteract. Therefore the venting time $t_{AH}$ is increased at the front high wheel to limit the yawing moment. On the other hand, yawing is easier to control when the braking pressure in the rear wheel cylinders is large, so the venting time $t_{AH}$ is then decreased in order to stop the vehicle as quickly as possible.

By using the process according to the invention, an attenuation of the yawing moment that adapts automatically to changing road conditions and vehicle types or loads is possible. This contributes to a shortening of the overall braking distance while maintaining controllability of the vehicle. By including deregulating pressure in the detection of the admissible pressure difference, the road quality as well as the load of the vehicle are both taken into account in an especially simple manner.

The organization and operation of this invention will be understood from a consideration of detailed descriptions of illustrative embodiments, which follow, when taken in conjunction with the accompanying drawings.

DETAILED DESCRIPTION OF THE INVENTION

Figure 1:
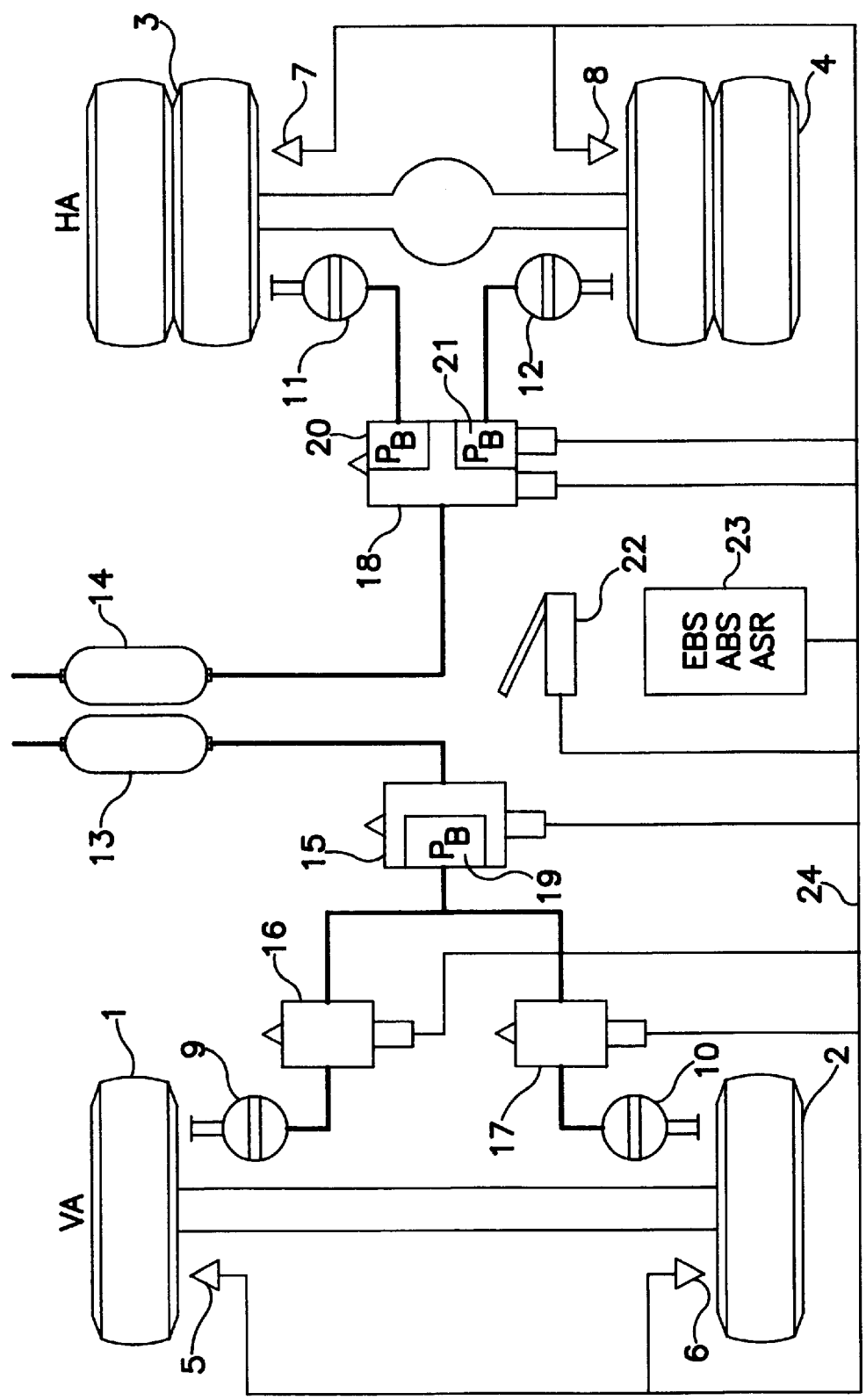
FIG. 1 is a schematic diagram of an electronic braking system (EBS) with an integrated anti-lock braking system (ABS)

FIG. 1 shows a schematic diagram of a braking system of a utility vehicle with an electronic braking system (EBS) as well as integrated ABS and automatic slip control (ASR) functions. The vehicle has wheels (1, 2) on the front axle (VA) as well as drive wheels (3, 4) that are fitted with dual tires on the rear axle (HA). The rotational speeds of all the wheels can be sensed by means of rotational speed sensors (5 to 8). The wheels of the front axle are braked with brake cylinders (9, 10), and the wheels of the rear axle are braked with brake cylinders (11, 12). Compressed air is stored in supply tanks (13, 14) and serves in this case for the transmission of the braking forces. The tank (14) for the rear axle is connected via a proportional valve (18) to the brake cylinders (11, 12) of the rear axle. The proportional valve (18) can be triggered electrically through signals that come from an electronic control module (23). The braking pressures ($P_B$) of the brake cylinders (11, 12) of the rear wheels are sensed through pressure sensors (20, 21) and transmitted back to the electronic control module (23). In this manner, precise closed loop control of the desired braking pressure is possible at the rear wheels. The driver indicates the desired pressure at braking-pressure transmitter (22), which emits a corresponding electrical output signal. The brake-pressure transmitter (22) and all other electrical components are connected to a communication bus (24) that is suited for the transmission of information in both directions. It may be a Controller-Area Network (CAN) bus, for example, in which case each component also contains a compatible interface to this bus. It is also possible to connect the electrical components with conventional wiring instead of a bus.

A shared proportional valve (15) adjusts the braking pressure of the cylinders (9, 10) at the front wheels. This proportional valve is provided with a pressure sensor (19) which senses the pressure at the output of the proportional valve (15). Individual adjustment of the pressures at the two front wheels is not possible here. Instead, the output of the proportional valve (15) is connected through ABS valves (16, 17) to the brake cylinders (9, 10) of the front axle. These ABS valves (16, 17) each have an open state and a closed state, and they can also be controlled from the communication bus (24). Here too, conventional wiring can be provided instead of a communication bus.

The brake control system described above is known as a hybrid system. Such a system has the advantage that the proportional valve (15) can be made much more simply and at lower cost than the dual proportional valve (18) of the rear axle. Because the proportional valve (15) need not assume any anti-lock braking tasks, it does not need to be able to adjust the pressure quickly. The anti-lock braking function is instead assumed by the earlier-mentioned ABS valves (16, 17), which are able to open and close quickly. In this manner the anti-lock braking function, which is especially important on the front axle, can be carried out very quickly. Furthermore, the cost of the single slow proportional valve (15) and the two fast ABS valves (16, 17) is less than that of the two fast proportional valves at the front axle of a non-hybrid system.

In the hybrid system, it is possible to set a desired braking pressure in the cylinders (9, 10) at the front axle provided the ABS valves (16, 17) remain open as in normal braking. During hard braking, the ABS valves may open and close, and then the braking pressures occurring in the brake cylinders (9, 10) of the front axle are no longer known in detail. The setting of a specific differential pressure ΔP, or yawing moment, between the two cylinders (9, 10) of the front axle is therefore not possible for the front axle of such a hybrid system.

Figures 2A, 2B, 2C:
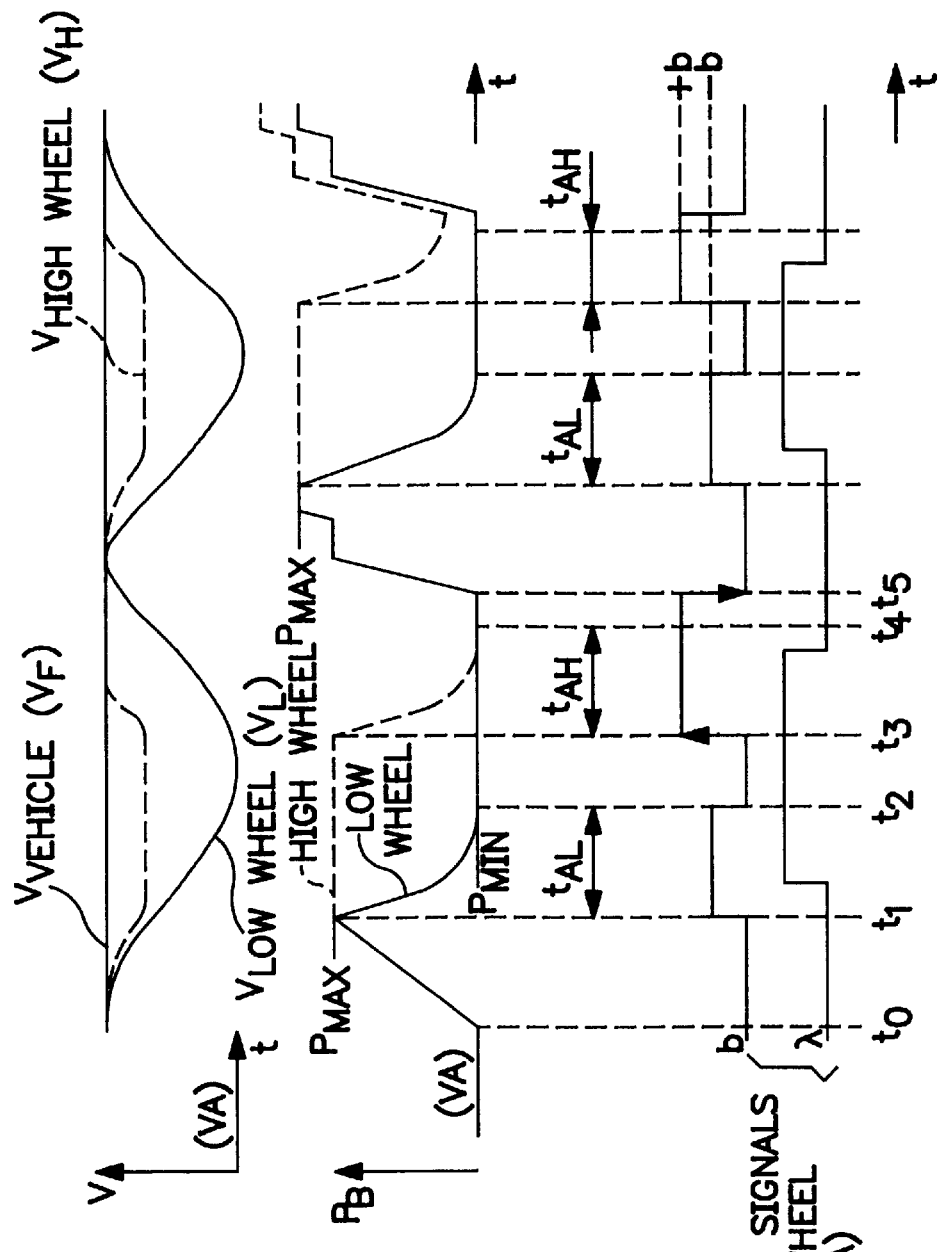
FIG. 2 is a diagram in which wheel velocities (V), braking pressures ($P_B$) and control signals (±b, λ) of the low wheel and of the high wheel of the steering axle (front axle VA) during controlled braking are shown over the period of time (t).

FIG. 2 shows different speeds, pressures and control signals as functions of time t during ABS-controlled braking. The evenly decreasing vehicle speed ($V_F$) and the periodically varying speed of the front low wheel ($V_L$) and the front high wheel ($V_H$) are shown in FIG. 2a. The front high wheel is co-controlled approximately in synchronization with the front low wheel while the ABS is active. FIG. 2b shows the braking pressures ($P_B$) in the cylinders of the high and low wheel of the front axle as functions of time. Their variation results from the opening and closing of the ABS valves (16, 17). The ABS operates these valves in response to the periodic acceleration (±b) and slip (λ) of the low front wheel, which are shown in FIG. 2c.

A hard braking action begins at time $t_0$ as shown in FIG. 2. The braking pressure ($P_B$) in the front wheel cylinders rises up to $P_{max}$ at time $t_1$, when a −b control signal appears. The braking pressure in the low wheel then begins to drop again, reaching $P_{min}$ at time $t_2$ when the −b signal disappears again. The time interval $t_{AL}$ from $t_1$ to $t_2$ is ascertained within the electronic control module (23) and is stored. The pressure in the high wheel cylinder remains constant at $P_{max}$ from $t_1$ until time $t_3$, when a +b control signal appears. Then the braking pressure of the high wheel also begins to fall towards $P_{min}$, and it continues to fall until time $t_4$, which is not determined by the control signals. Instead, the electronic is control module (23) calculates the time interval $t_{AH}$ from $t_3$ to $t_4$ as will be discussed in further detail below. The +b signal disappears at time $t_5$, and then a second ABS control cycle begins with pressure rising in both front wheel cylinders. The control signal λ shown in FIG. 2c indicates that the low wheel exceeds a slip threshold starting after time $t_1$, when the low front wheel starts to decelerate. The control signal λ falls below threshold after time $t_3$, when the low front wheel starts to re-accelerate toward the angular speed that matches the speed of the vehicle. In the example described above, the λ signal is not used directly. Among other, things however, it allows the ABS to prevent a so-called "creeping lockup" of the wheels.

According to the invention, an optimal yawing moment that adapts to road conditions and the load of the vehicle is achieved by venting the brake cylinder (9 or 10) of the co-controlled high wheel of the front axle (VA) for a time ($t_{AH}$) that depends on the braking pressures ($P_B$) of the high and low wheels of the rear axle (drive axle) (HA). The venting time may also depend on the braking pressure of the low wheel of the front axle (VA). The so-called deregulating pressure ($P_{max}$ in FIG. 2b) is advantageously used as the above-mentioned braking pressure ($P_B$) This deregulating pressure is the highest pressure achieved in the brake cylinder during an ABS regulating cycle, which generally ends in a pressure reduction phase. The braking pressure is directly proportional to the braking force acting between the tire and the roadway. As a result, the deregulating pressure is directly proportional to the maximum braking force and thereby also to the traction between tire and road. Because this potential increases as the coefficient of friction (i.e. road quality) and wheel load increase, the deregulating pressure receives information on road quality as well as on the vehicle load. It is generally sufficient to compute the above-mentioned venting time ($t_{AH}$) using the distinct deregulating pressures of the high and low wheels on the rear axle. This is advantageous because separate (relatively expensive) pressure sensors need only be provided for the cylinders controlling the brakes of the wheels on the rear axle.

In the simplest case, the venting time $t_{AH}$ of the co-controlled high wheel of the front axle (VA) depends on the sum of the deregulating pressures at the rear wheel cylinders. That is, the control module (23) computes $t_{AH}$ according to the formula $$t_{AH} = A_1 \times t_{AL}$$

where $t_{AH}$=the venting time of the co-controlled front wheel (high wheel), $t_{AL}$=the venting time of the controlled front wheel (low wheel), $A_1 = K_1 - K_2 \times (P_{maxH} + P_{maxL})$, $K_1$, $K_2$=constants, $P_{maxH}$=deregulating pressure of the drive wheel on the high side, and $P_{maxL}$=deregulating pressure of the drive wheel on the low side.

The resulting values for time $t_{AL}$ are ascertained by the electronic control module (23). Appropriate ranges for the values of the constants have been found to be $0.4 \leq K_1 \leq 0.9$ and $0 \leq K_2 \leq 0.07$/bar. It is advantageous to limit the value of $A_1$ to values between 0.0 and 1.0 because the venting time $t_{AH}$ is then smaller than the venting time $t_{AL}$. As a result, the maximum value of the differential pressure or yawing moment rises gradually and is limited. It may also be advantageous to further limit $A_1$ to values between 0.2 and 0.8.

It may also be advantageous to use the difference between the deregulating pressures at the rear wheel cylinders. In this case, the venting time ($t_{AH}$) of the co-controlled front high wheel cylinder ($t_{AH}$) is computed according to the formula $$t_{AH} = A_2 \times t_{AL}$$

where $A_2 = K_3 - K_4 \times (P_{maxH} - P_{maxL})$ $K_3$, $K_4$=constants.

In this manner, the load of the vehicle is especially well taken into account when great differences between the coefficient of friction on the high and low sides of the vehicle occur.

It may also be advantageous to use the ratio of the deregulating pressures at the rear wheel cylinders. That is, the venting time ($t_{AH}$) of the co-controlled front high wheel cylinder ($t_{AH}$) is computed according to the formula $$t_{AH} = A_3 \times t_{AL}$$

where $A_3 = K_6 - K_7 \times (P_{maxH}/P_{maxL})$ $K_6$, $K_7$=constants.

In this case, the optimized yawing moment is less dependent on the magnitude of the deregulating pressures at the rear wheels and therefore of the loads as well as the ratios of braking force to braking pressure there.

For an unloaded vehicle, the deregulating pressures at the wheels on the rear axle are small even when both coefficients are high. Therefore, it may also be advantageous to use additionally the deregulating pressure at the low front wheel in computing the venting time $t_{AH}$ according to the formula $$t_{AH} = A_4 \times t_{AL}$$

where $A_4 = K_8 - K_9 \times (P_{maxH} + P_{maxL} + K_{10} \times P_{maxLVA})$, $K_8$, $K_9$, $K_{10}$=constants, and $P_{maxLVA}$=the deregulating pressure at the controlled front wheel on the low side.

This type of computation has the advantage that the coefficient of friction on the low side is taken more into account. By adding a term proportional to the deregulating pressure on the controlled front low wheel, the venting time $t_{AH}$ is shortened and the yawing moment is increased when the coefficients of friction are high and the vehicle brakes in a stable manner. Thus more braking force can be utilized and the braking distance can be shortened for an unloaded vehicle braking hard on a high-quality roadway.

In the formulas given above, the venting time $t_{AH}$ of the high front wheel depends on the deregulating pressures $P_{maxH}$ and $P_{maxL}$ at the wheels on the rear axle. It may also be advantageous to substitute the average of the holding and deregulating pressures at the rear wheels according to the formula $$P_m = (P_{max} + P_{min})/2$$

where $P_{min}$ represents the so-called holding pressure. This is the brake pressure at which the deceleration of the slipping wheel drops to zero (see FIG. 2b).

Furthermore, it may be advantageous to use time averages of the braking pressures at the rear wheels in computing the venting time $t_{AH}$ instead of deregulating pressures ($P_{maxH}$, $P_{maxL}$). These averages can be calculated within the electronic control module (23) by passing the braking-pressure signals through low-pass filters.

Vehicles are also in use where, in addition to the driven rear axle, an additional lifting axle with lifting wheels is provided at the rear of the vehicle. When the lifting wheels are lowered, the load on the drive wheels naturally decreases. The resulting decreased maximum braking forces between the drive wheels and the roadway occur at reduced deregulating pressures. According to the above-mentioned formulas for the venting time $t_{AH}$, the high front wheel would be vented sooner to reduce the yawing moment. This result is not desirable, however, because both theory and experience show that a vehicle with a lowered lifting axle brakes in a more stable manner on a roadway where the coefficients of friction are different on the left and right sides ($\mu$ split) Therefore, in this case, the driver would be able to control the vehicle with a higher braking force difference ($\Delta P$) between the wheels of the steering axle, and the stopping distance would be desirably shortened. It may therefore be advantageous to detect the lifting axle position by suitable means and transmit the position of the lifting axle to the EBS or ABS of the electronic control module (23). Then the venting time $t_{AH}$ of the co-controlled wheel of the front axle (VA) can be shortened to take advantage of the higher permissible $\Delta P$ when the lifting axle is lowered and thus to shorten the braking distance. This can only be done by modifying the term $A_1$ in the formula $$t_{AH} = A_1 \times t_{AL}$$

by inserting a constant $K_{11}$ as follows $$A_1 = K_1 - K_2 \times K_{11} \times (P_{maxH} + P_{maxL})$$

$K_{11} \geq 1$.

Because the inserted factor $K_{11}$ is greater than 1, $A_1$ becomes smaller and the venting time $t_{AH}$ of the front high wheel is shortened. Thus the high front wheel brakes more effectively although the differential pressure ($\Delta P$) at the front axle, and therefore the yawing moment increases by an admissible amount.

If in special cases braking pressure information for the brake cylinder of the front axle is also available, it may also be advantageous to modify the definition of $A_4$ in the corresponding formula for the venting time $$t_{AH} = A_4 \times t_{AL}.$$

The constant $K_{11}$ is inserted so that $$A_4 = K_8 - K_9 \times [K_{11} \times (P_{maxH} + P_{maxL}) + K_{10} \times P_{maxLVA}]$$

where $K_{11} = (W_D + W_L)/W_D$, $W_D$=wheel load on drive axle, and $W_L$=wheel load on lifting axle.

This quotient can be calculated roughly from the vehicle data in most cases, because a fixed axle load ratio with lowered lifting axle is usually indicated in the design. An appropriate range for $K_{11}$ is given by $1.3 \leq K_{11} \leq 2$, and 1.5 can be used in the European Community on most vehicle models. It may also be advantageous to sense the loads on the drive and lifting axles and transmit them electronically to the ABS or EBS. In this manner, the above-described quotient for $K_{11}$ can be calculated with greater precision. This is particularly advantageous for vehicles where the axle load ratio with lowered lifting axle is not constant but can be selected, e.g., in order to control traction at the drive wheels.

While the invention has been described by reference to specific embodiments, this was for purposes of illustration only. Numerous alternative embodiments will be apparent to those skilled in the art and are considered to be within the scope of the invention.

We claim:

1. A process for attenuating the yawing moment that develops during hard braking in a vehicle with low wheels traveling on a portion of a roadway having a low coefficient of friction and high wheels traveling on a different portion of the roadway having a high coefficient of friction, the wheels being mounted on axles at the front and rear of said vehicle, said rear axle being a drive axle, each said front and rear wheel having brakes actuated by a cylinder associated therewith which is supplied with a braking pressure to actuate said brakes, said vehicle being equipped with an anti-lock braking system which operates to vent any of said cylinders to a holding pressure when the braking pressure of any of said wheels reaches a deregulating pressure, said process comprising venting said cylinder of said front high wheel for a time $t_{AH}$ which depends on the braking pressure of the high and low wheels of the rear axle.

2. The process of claim 1 wherein said venting time $t_{AH}$ also depends on the braking pressure of the low wheel of the front axle.

3. The process of claim 1 wherein said venting time $t_{AH}$ depends on the deregulating pressure of the high and low wheels of the rear axle.

4. The process of claim 3 wherein said venting time $t_{AH}$ also depends on the deregulating pressure of the low wheel of the front axle.

5. The process of claim 3 wherein said venting time $t_{AH}$ of said front high wheel is calculated according to the formula $$t_{AH} = A_1 \times t_{AL}$$

wherein $t_{AL}$=venting time of said front low wheel cylinder, $A_1 = K_1 - K_2 \times (P_{maxH} + P_{maxL})$, $K_1$, $K_2$=constants, $P_{maxH}$=the deregulating pressure of said high wheel of said rear axle, and $P_{maxL}$=the deregulating pressure of said low wheel of said rear axle.

6. The process of claim 5 wherein said vehicle includes a lifting axle, and wherein upon lowering of said lifting axle, the constant $A_1$ is recalculated according to the formula $$A_1 = K_1 - K_2 \times K_{11} \times (P_{maxH} + P_{maxL})$$

wherein $K_{11} \geq 1$.

7. The process of claim 6 wherein the constant $K_{11}$ is formed ccording to the formula $$K_{11} = (W_D + W_L)/W_D$$

wherein $W_D$=load on rear axle, and $W_L$=load on lifting axle.

8. The process of claim 5 wherein the constant $A_1$ is between 0.0 and 1.0.

9. The process of claim 5 wherein the constant $A_1$ is between 0.2 and 0.8.

10. The process of claim 3 wherein the venting time $t_{AH}$ of the front high wheel is calculated according to the formula $$t_{AH} = A_2 \times t_{AL}$$

wherein $t_{AL}$=venting time of said front low wheel cylinder, $A_2 = K_3 - K_4 \times (P_{maxH} - P_{maxL})$, $K_3$, $K_4$=constants, $P_{maxH}$=the deregulating pressure of said high wheel of said rear axle, and $P_{maxL}$=the deregulating pressure of said low wheel of said rear axle.

11. The process of claim 6 wherein the constant $A_2$ is between 0.0 and 1.0.

12. The process of claim 6 wherein the constant $A_2$ is between 0.2 and 0.8.

13. The process of claim 3 wherein the venting time $t_{AH}$ of the front high wheel is calculated according to the formula $$t_{AH}=A_3 \times t_{AL}$$

wherein $t_{AL}$=venting time of said front low wheel cylinder, $A_3=K_6-K_7 \times (P_{maxH}/P_{maxL})$, $K_6$, $K_7$=constants, $P_{maxH}$=the deregulating pressure of said high wheel of said rear axle, and $P_{maxL}$=the deregulating pressure of said low wheel of said rear axle.

14. The process of claim 13 wherein the constant $A_3$ is between 0.0 and 1.0.

15. The process of claim 13 wherein the constant $A_3$ is between 0.2 and 0.8.

16. The process of claim 3 wherein the venting time $t_{AH}$ of the front high wheel cylinder is calculated according to the formula $$t_{AH}=A_4 \times t_{AL}$$

wherein $t_{AL}$=venting time of said front low wheel cylinder, $A_4=K_8-K_9 \times (P_{maxH}+P_{maxL}+K_{10} \times P_{maxLVA})$ $K_8$, $K_9$, $K_{10}$=constants, $P_{maxH}$=the deregulating pressure of said high wheel of said rear axle, $P_{maxL}$=the deregulating pressure of said low wheel of said rear axle, and $P_{maxLVA}$=the deregulating pressure of said low wheel of said front axle.

17. The process of claim 16 wherein said vehicle includes a lifting axle, and wherein upon lowering of said lifting axle, the constant $A_4$ is recalculated according to the formula $$A_4=K_8-K_9 \times [K_{11} \times (P_{maxH}+P_{maxL})+K_{10} \times P_{maxLVA}]$$

wherein $K_{11} \geq 1$.

18. The process of claim 17 wherein the constant $K_{11}$ is formed according to the formula $$K_{11}=(W_D+W_L)/W_D$$

wherein $W_D$=load on rear axle, and $W_L$=load on lifting axle.

19. The process of claim 16 wherein the constant $A_4$ is between 0.0 and 1.0.

20. The process of claim 16 wherein the constant $A_4$ is between 0.2 and 0.8.

21. The process of claim 1 wherein said venting time $t_{AH}$ depends on the mean of said holding pressures and said deregulating pressures in said wheels on said rear axle according to the formulas $$P_{mH}=(P_{maxH}+P_{minH})/2 \text{ and}$$

$$P_{mL}=(P_{maxL}+P_{minL})/2$$

wherein $P_{maxH}$=the deregulating pressure of said high wheel of said rear axle, $P_{minH}$=holding pressure of said high wheel of said rear axle, $P_{maxL}$=the deregulating pressure of said low wheel of said rear axle, and $P_{minL}$=the holding pressure of said low wheel of said rear axle.

22. The process of claim 21 wherein said venting time $t_{AH}$ also depends on the mean of said holding pressure and said deregulating pressure at said front low wheel according to the formula $$P_{mLVA}=(P_{maxLVA}+P_{minLVA})/2$$

wherein $P_{maxLVA}$=the deregulating pressure of said front low wheel, and $P_{minLVA}$=the holding pressure of said front low wheel.

23. The process of claim 1 wherein said venting time $t_{AH}$ depends on the time averages of the braking pressures of said wheels of said rear axle.

24. The process of claim 23 wherein said time averages of said pressures of said wheels of said rear axle are formed by low-pass filters.

25. The process of claim 2 wherein said venting time $t_{AH}$ depends on the time averages of the braking pressures of said wheels of said rear axle and said low wheel of said front axle.

26. The process of claim 25 wherein said time averages of said pressures of said wheels of said rear axle and said low wheel of said front axle are formed by a low-pass filter.

* * * * *